Inventor
Robert J. Ely
By Wallace, Kinzer and Dorn
Attorneys

United States Patent Office 3,487,530
Patented Jan. 6, 1970

3,487,530
METHOD OF REPAIRING CASTING DEFECTS
Robert J. Ely, Suffern, N.Y., assignor to Abex Corporation, New York, N.Y., a corporation of Delaware
Filed Oct. 9, 1967, Ser. No. 673,872
Int. Cl. B23p 7/04; B22d 19/10
U.S. Cl. 29—402    3 Claims

ABSTRACT OF THE DISCLOSURE

Casting defects, in the form of a cavity, are remedied by re-forming the defect to a predetermined dimension. The resultant re-formed cavity is filled by one end of a plug; a diffusion bond is established; and the excess of the plug is removed.

---

Figure 1A:
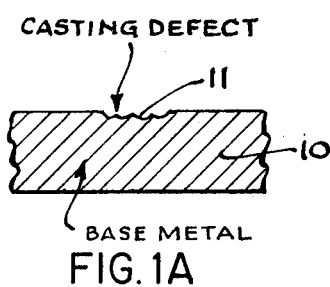
Figure 1B:
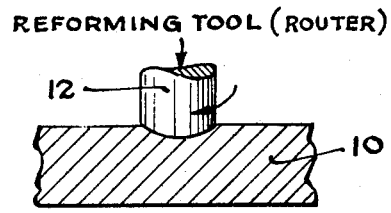

Repair welding of castings by conventional fusion processes (e.g. welding rod) has been common practice in foundries for many years. The degree of difficulty in making sound fusion weld repairs is generally associated with the hot strength and hot ductility of the material to be welded and the filler rods used. So-called superalloys have been developed in recent years. These are designed to have relatively high strengths at elevated temperatures, and as a result the repair welding of these alloys by conventional fusion processes is extremely difficult; and in some alloys at the current state of the art, impossible because the thermal gradients involved literally tear the base metal apart at the welding zone. Until recent date the castings made of these alloys have of necessity been very small (a few ounces to several pounds) and generally produced by a precision or expendable pattern process. The difficulty of welding and the ability of the precision casting process to produce relatively defect-free components has made weld repair attempts uneconomical, it being deemed cheaper to scrap the component than repair it.

With the advent of larger superalloy and refractory metal castings, economics would favor repair rather than scrapping such parts for modest surface defects, and the primary object of the present invention is to enable this to be achieved economically by a diffusion bonding process. Diffusion bonding consists of bringing two clean smooth metal surfaces together under controlled conditions of heat, time and pressure parameters. Selection of the proper parameters is dependent entirely on metallurgical considerations and results in a diffusion bond between the surfaces without fusion in the normal sense of the word.

For discrete surface defects of indeterminate contour in large castings a series of standard repair plugs of predetermined contour will be prepared along with forming tools matched to these plugs, the latter being used to re-form the defect in the casting to one of predetermined, precision contour. By using a series of standard plugs it is possible to select the proper re-forming tool and to determine for each of these standards the correct combination of time, temperature and pressure to produce diffusion bonds of high integrity. Such a process eliminates the need for fusion welding with its inherent cracking probability.

Other and further objects of the present invention will be apparent from the following description and claims and are illustrated in the accompanying drawing which, by way of illustration, shows preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

Figure 1C:
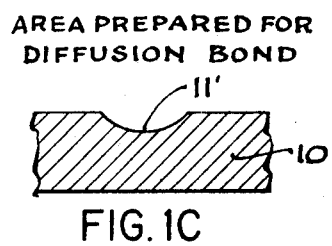
Figure 1D:
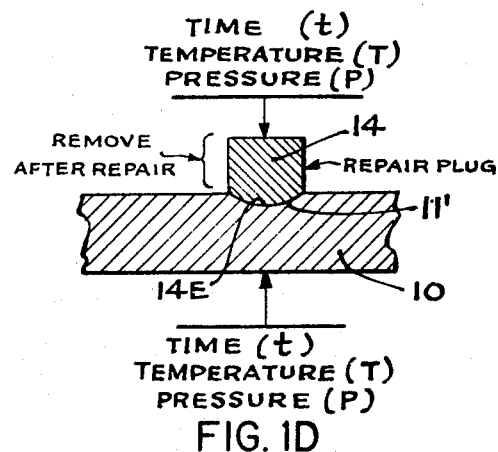
Figure 1E:
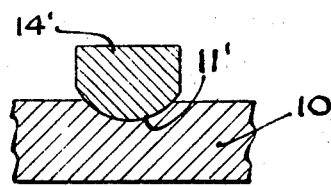
Figure 1F:
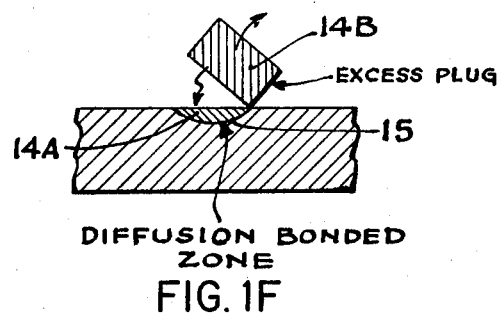
Figure 2:
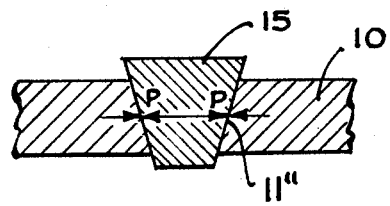

In the drawings:

FIGS. 1A through 1F are schematic illustrations of the various steps contemplated under and in accordance with the present invention; and FIG. 2 is an illustration of another practice under the present invention.

Diffusion bonding entails an operation in which clean, intimate-fitting surfaces are caused to bond primarily under the application of pressure, just under yield strength and the maintenance of a temperature less than that which would actually melt the metals, for a time sufficient to permit what may be viewed as atomic diffusion of one surface into the other. I employ this principle in a novel fashion in repairing casting defects, and in particular defects in the form of a cavity of indeterminate contour.

The steps of repairing casting defects in accordance with the present invention are illustrated in various stages in the drawings, and referring to FIG. 1A, the base metal or superalloy casting to be repaired is identified by reference character 10, this casting presenting a defect 11 of indeterminate contour in one surface thereof. The cavity 11 is re-formed, FIG. 1B, by a re-forming tool in the form of a router 12 as by rotating the router while rigidly supporting the base metal casting 10. In this fashion, a re-formed defect cavity 11', FIG. 1C, is formed of predetermined depth and lateral dimension or diameter, and the tool for the routing operation is so selected as to result in a uniform, smooth cavity 11' which is preferably cleaned or etched chemically to bare the pristine metal, free of oxides and other impurities or tramp materials likely to interfere with a good diffusion bond. In the next stage of operation, an equally clean repair plug 14 is juxtaposed on the re-formed cavity 11', and the end 14E of the repair plug is substantially an exact complement of the re-formed cavity so to at least fill the cavity 11' as shown in FIG. 1D. Thus, the contoured end 14E of the repair plug at least presents the radius of curvature of the re-formed cavity 11', although it may be advantageous to use a repair plug 14', FIG. 1E, slightly larger than the lateral width or diameter of the re-formed cavity 11' to assure that the re-formed cavity is in fact filled by the complementary contoured end of the repair plug.

Following completion of the step shown in FIG. 1D, with the complementally shaped or curved surfaces in intimate contact as shown, the parameters for the diffusion bond are established, and these will depend of course upon the metallurgy of the metals being used as will be readily apparent to those skilled in the art.

In generating the diffusion bond, a time-temperature-pressure relationship ($t$-T-P, FIG. 1D) is established of such scope and magnitude as to encourage and complete the diffusion phenomenon. This may be accomplished most conveniently, as one example, by a clamp exerting pressure on the top of the plug and at the underside of the base metal 10, establishing the parameter P, and the clamped assembly may then be transferred to an oven or furnace where the clamped structure is maintained at temperature T throughout the time period $t$.

After the assembly has sufficiently cooled upon removal from the temperature environment, the excess of the repair plug 14B, in excess of that which fills the re-formed cavity, 14A, FIG. 1E, is removed by grinding or machining. The defect is thus remedied and the repair material 14A is permanently joined to the base metal along the diffusion bond zone 15, FIG. 1F. Of course a series of standard repair sizes are readily visualized from the standpoint of selected diameters. Thus, defects of a size capable of being remedied in accordance with the present invention may be as small as an inch or less and up to several inches. The routing tools would be of appropriate size such that the selected tool for re-forming a given defect would have a working diameter at least slightly larger than the maximum diameter or width of the cavity representing the defect to assure a perfectly symmetrical contour 11'. The repair plugs would match the re-forming tools, or may be slightly larger in diameter as mentioned above in connection with FIG. 1E.

Of course it will be appreciated that different geometric patterns may be resorted to, and in this connection the casting defect, FIG. 1A, may be repaired by boring or drilling the defect to re-form the same into a truncated cone-shaped opening or hole 11'', FIG. 2, into which will be driven with a forceful hammer blow a complementally shaped repair plug 15 of tapered form. In this instance the pressure parameter P (FIG. 2) would be generated outside the heating furnace by the mechanical force established during seating of the repair plug, in which event no additional pressure need be maintained in the furnace during generation of the time ($t$) and temperature ($T$) parameters.

The process may also be practiced in the form of so-called friction welding. Here, the two elements (the repair plug and the re-formed cavity) to be joined are brought together under controlled pressure and controlled relative movement such that relative rotation between the base metal and the repair plug, under a predetermined amount of pressure, will generate sufficient frictional heat as to provide the necessary bonding energy which again may be measured in terms of time, temperature and pressure. Friction welding as thus defined is deemed to be an equivalent of the more precisely controlled diffusion technique explained above, and may actually be viewed as a specialized case of diffusion bonding under and in accordance with the principles of the present invention.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:
1. A method of repairing a defect in a cast member presented by a cavity of indeterminate contour in the member and comprising; re-forming the cavity to one presenting a surface of determined contour, filling the re-formed cavity with a plug member of metal presenting a surface which is substantially the exact complement of the exposed surface of the re-formed cavity with which it is in intimate contact, and establishing a diffusion bond between the intimately contacting surfaces of the plug and the re-formed cavity, said diffusion bond being created by the application of pressure and temperature applied to said members jointly for a period of time sufficient to induce atomic diffusion between the intimately contacting surfaces without reaching their melting points and without exceeding their yield points.

2. A method according to claim 1 wherein the indeterminate cavity is re-formed by routing to a predetermined depth and lateral dimension and wherein any excess of the plug, exceeding that required to fill the re-formed cavity, is removed after completion of the diffusion bond.

3. A method according to claim 1 wherein the cavity is re-formed to be of cone shape, forcing a tapered plug of complemental shape into the cavity, and completing the diffusion bond in a furnace.

References Cited
UNITED STATES PATENTS

| | | | |
|---|---|---|---|
| 1,397,167 | 11/1921 | Hopper | 52—514 |
| 2,322,507 | 6/1943 | Cole | 29—498 |
| 2,537,533 | 1/1951 | Ingalls | 29—402 |
| 3,339,269 | 9/1967 | Hanink | 29—498 X |

JOHN F. CAMPBELL, Primary Examiner

D. C. REILEY, Assistant Examiner

U.S. Cl. X.R.

29—470.3, 482; 52—514